US012705901B2

(12) United States Patent
Singh et al.

(10) Patent No.: US 12,705,901 B2
(45) Date of Patent: Aug. 11, 2026

(54) TRAINING MACHINE LEARNING NETWORKS FOR CONTROLLING VEHICLE OPERATION

(71) Applicant: Motional AD LLC, Boston, MA (US)

(72) Inventors: Apoorv Singh, Pittsburgh, PA (US); Varun Kumar Reddy Bankiti, Bellevue, WA (US)

(73) Assignee: Motional AD LLC, Boston, MA (US)

( * ) Notice: Subject to any disclaimer, the term of this patent is extended or adjusted under 35 U.S.C. 154(b) by 429 days.

(21) Appl. No.: 18/141,014

(22) Filed: Apr. 28, 2023

(65) Prior Publication Data

US 2024/0296681 A1 Sep. 5, 2024

Related U.S. Application Data

(60) Provisional application No. 63/449,539, filed on Mar. 2, 2023.

(51) Int. Cl.
*G06V 20/00* (2022.01)
*G06V 10/44* (2022.01)
*G06V 10/82* (2022.01)
*G06V 20/56* (2022.01)

(52) U.S. Cl.
CPC ............ *G06V 20/56* (2022.01); *G06V 10/454* (2022.01); *G06V 10/82* (2022.01)

(58) Field of Classification Search
CPC ...... G06V 20/56; G06V 10/454; G06V 10/82; G06V 20/58
See application file for complete search history.

(56) References Cited

U.S. PATENT DOCUMENTS

2020/0218979 A1* 7/2020 Kwon ...................... G06N 3/08
2021/0192748 A1* 6/2021 Morales Morales .. G06N 3/088
2023/0280753 A1* 9/2023 Caine .................... G06V 20/54 701/59

OTHER PUBLICATIONS

Mamun et al, Designing Deep Neural Networks Robust to Sensor Failure in Mobile Health Environments, 44th Annual International Conference of the IEEE Engineering in Medicine & Biology Society (EMBC) (Year: 2022).*

Huang et al, Adversarial Training for Disease Prediction from Electronic Health Records with Missing Data, arXiv:1711.04126 (Year: 2018).*

(Continued)

*Primary Examiner* — Xiao Liu
(74) *Attorney, Agent, or Firm* — Fish & Richardson P.C.

(57) ABSTRACT

Provided are methods for training and evaluating machine learning networks. The methods can include obtaining ground truth data representing images of an environment of a vehicle. The methods can include determining a first plurality of subsets of the ground truth data. The methods can include mapping the first plurality of subsets to a plurality of sensors. The methods can include determining a second plurality of subsets of the ground truth data by removing at least one selected subset from the first plurality of subsets. The methods can include inputting the second plurality of subsets to at least one machine learning network. The methods can include predicting a surrounding view of the environment using the at least one machine learning network. Vehicles and non-transitory computer-readable storage media are also provided.

20 Claims, 13 Drawing Sheets

(56) References Cited

OTHER PUBLICATIONS

[No Author Listed], “Surface Vehicle Recommended Practice: Taxonomy and Definitions for Terms Related to Driving Automation Systems for On-Road Motor Vehicles,” SAE International, Standard J3016, Sep. 30, 2016, 30 pages.

Brownlee, “A Gentle Introduction to Dropout for Regularizing Deep Neural Networks,” Machine Learning Mystery, Aug. 6, 2019, retrieved on Jan. 30, 2024, retrieved from URL<https://machinelearningmastery.com/dropout-for-regularizing-deep-neural-networks/>, 26 pages.

* cited by examiner

TRAINING MACHINE LEARNING NETWORKS FOR CONTROLLING VEHICLE OPERATION

CROSS-REFERENCE TO RELATED APPLICATIONS

This application claims priority to U.S. Provisional Patent Application No. 63/449,539, filed on Mar. 2, 2023, the content of which is incorporated herein by reference.

BACKGROUND

A vehicle can be equipped with electronic devices that detect objects in the environment during the operation of the vehicle. For example, a vehicle, such as an autonomous vehicle (AV), can have sensors mounted at different locations of the vehicle to capture images of the environment surrounding the vehicle.

DETAILED DESCRIPTION

Figure 1:
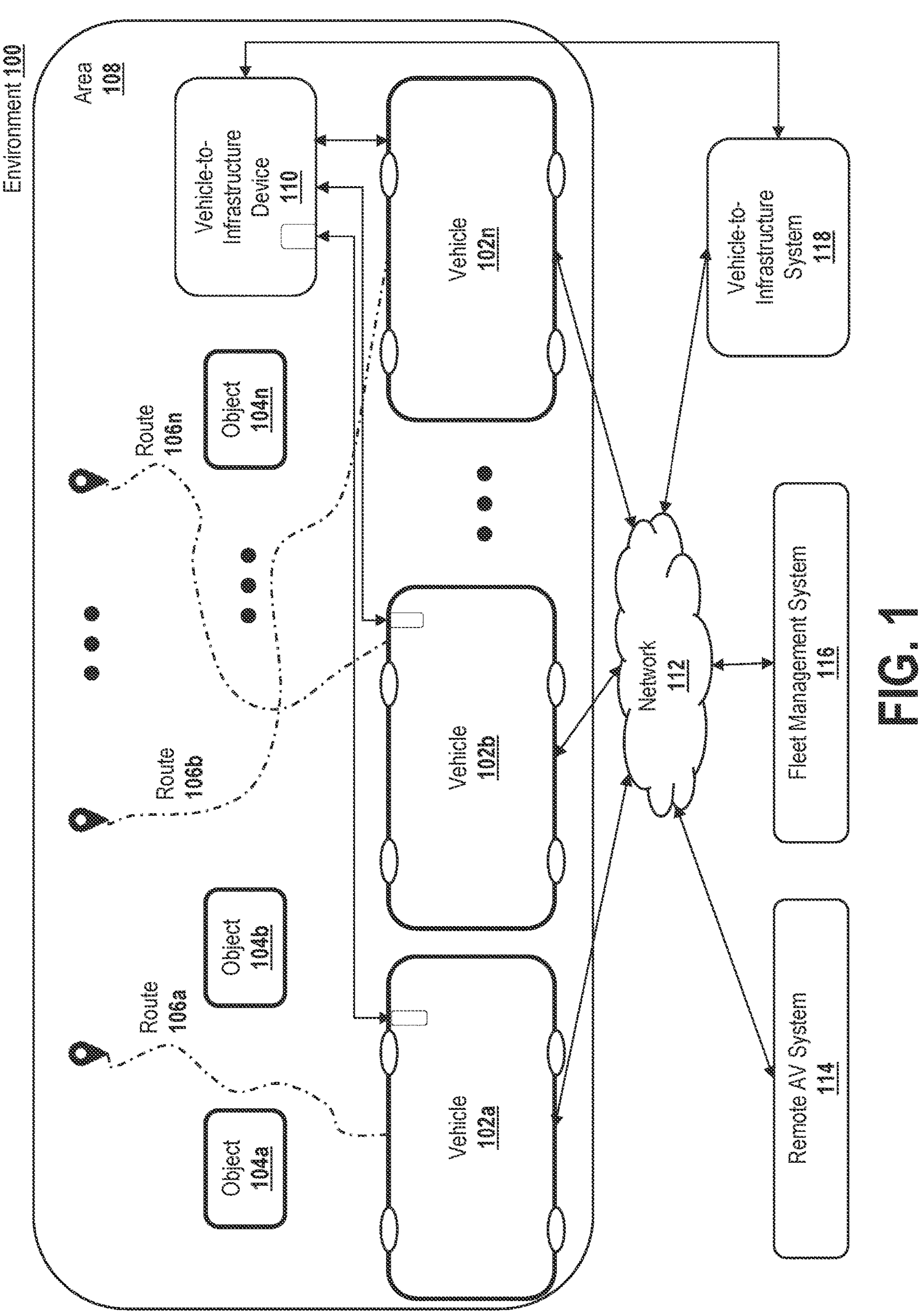
FIG. 1 illustrates an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement techniques for training and evaluating machine learning networks for processing data captured by multiple sensors (e.g., visible light cameras, infrared cameras, or Light Detection and Ranging [LiDAR] sensors) on a vehicle, with the data representing images of an environment surrounding the vehicle. Using such data, the machine learning networks are trained to generate a view of the environment, knowledge of which is used for controlling operation of the vehicle. Using the disclosed techniques, a machine learning network can be trained to generate views of the environment of the vehicle in scenarios where images from one or more of the multiple sensors are unavailable. By such training, the machine learning network is configured with the capability to predict the surrounding environment even with one or more missing image frames due to the one or more unavailable sensors.

In some embodiments, different models of machine learning networks are trained using the disclosed techniques, and the performance of the trained machine learning networks are evaluated and compared to one another. In such embodiments, based on the results of the comparison and evaluation, one or more machine learning networks are selected for deployment (e.g., use in real road environments) in one or more vehicles, for use in determining views of the surrounding environment. For example, a manufacturer or an operator of an AV can select one or more machine learning networks that meet a target robustness, such as showing consistent performance over different image frame drop rates (e.g., number of missing image frames due to unavailable sensors).

By virtue of the implementation of systems, methods, and computer program products described herein, the disclosed techniques for training and evaluating machine learning networks can improve the performance of a vehicle in determining a view of the surrounding environment. Compared to other machine learning networks, the machine learning networks thus trained can have improved capability to operate in non-ideal, real-time situations where image frames from all sensors of the vehicle are not always available. Furthermore, by comparative evaluation of the performance of the trained machine learning networks, a manufacturer or an operator of the vehicle can select and deploy one or more machine learning networks that best meet their needs.

Referring now to FIG. 1, illustrated is example environment 100 in which vehicles that include autonomous systems, as well as vehicles that do not, are operated. As illustrated, environment 100 includes vehicles 102*a*-102*n*, objects 104*a*-104*n*, routes 106*a*-106*n*, area 108, vehicle-to-infrastructure (V2I) device 110, network 112, remote autonomous vehicle (AV) system 114, fleet management system 116, and V2I system 118. Vehicles 102*a*-102*n*, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104*a*-104*n* interconnect with at least one of vehicles 102*a*-102*n*, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102*a*-102*n* (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106*a*-106*n* (referred to individually as route 106 and collectively as routes 106), as described herein. In some embodiments, one or more vehicles 102 include an autonomous system (e.g., an autonomous system that is the same as or similar to autonomous system 202).

Objects 104*a*-104*n* (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106*a*-106*n* (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
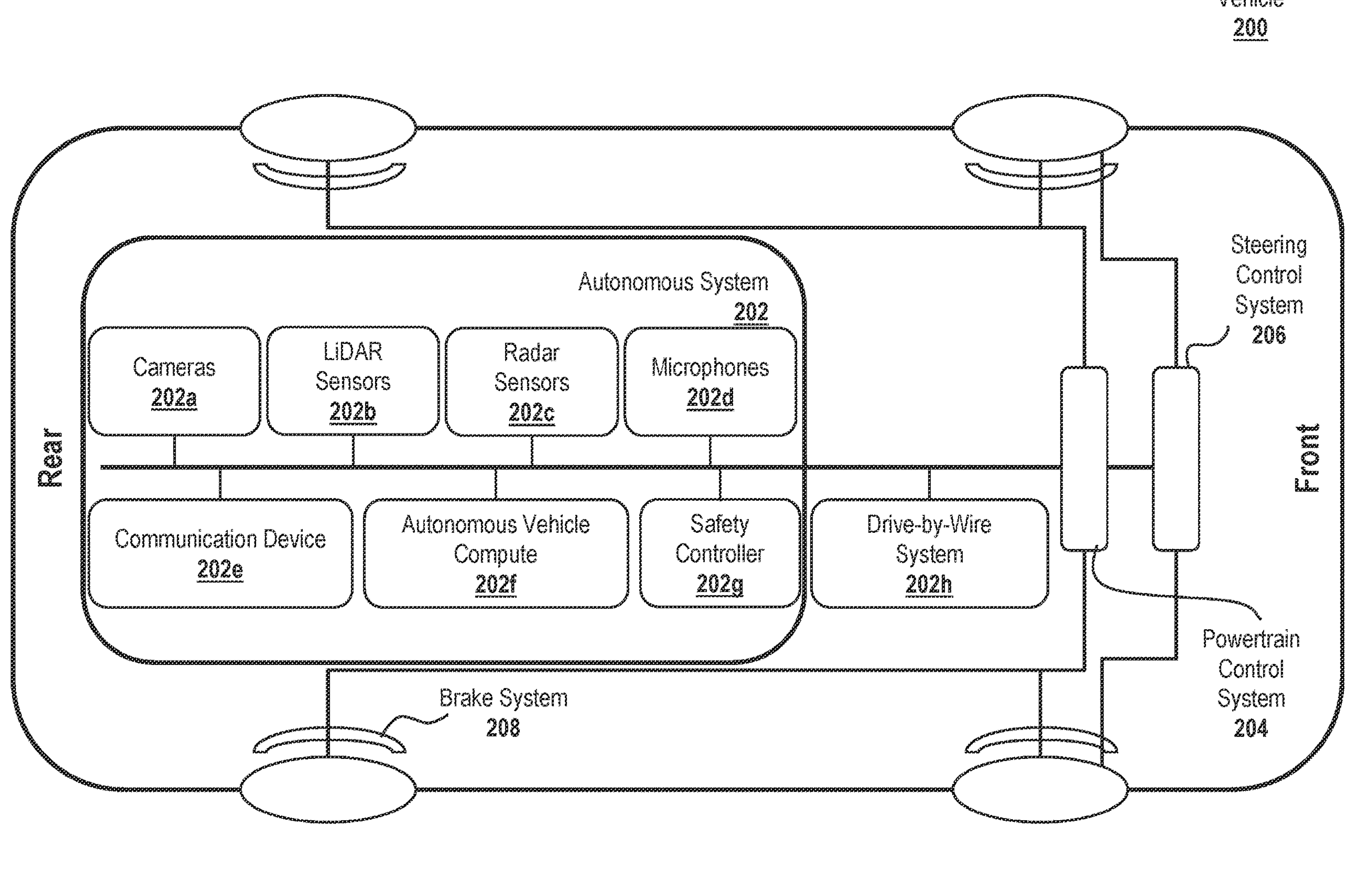
FIG. 2 is a diagram of one or more systems of a vehicle including an autonomous system.

Referring now to FIG. 2, vehicle 200 (which may be the same as, or similar to vehicle 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202*a*, LiDAR sensors 202*b*, radar sensors 202*c*, and microphones 202*d*. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202*e*, autonomous vehicle compute 202*f*, drive-by-wire (DBW) system 202*h*, and safety controller 202*g*.

Figure 3:
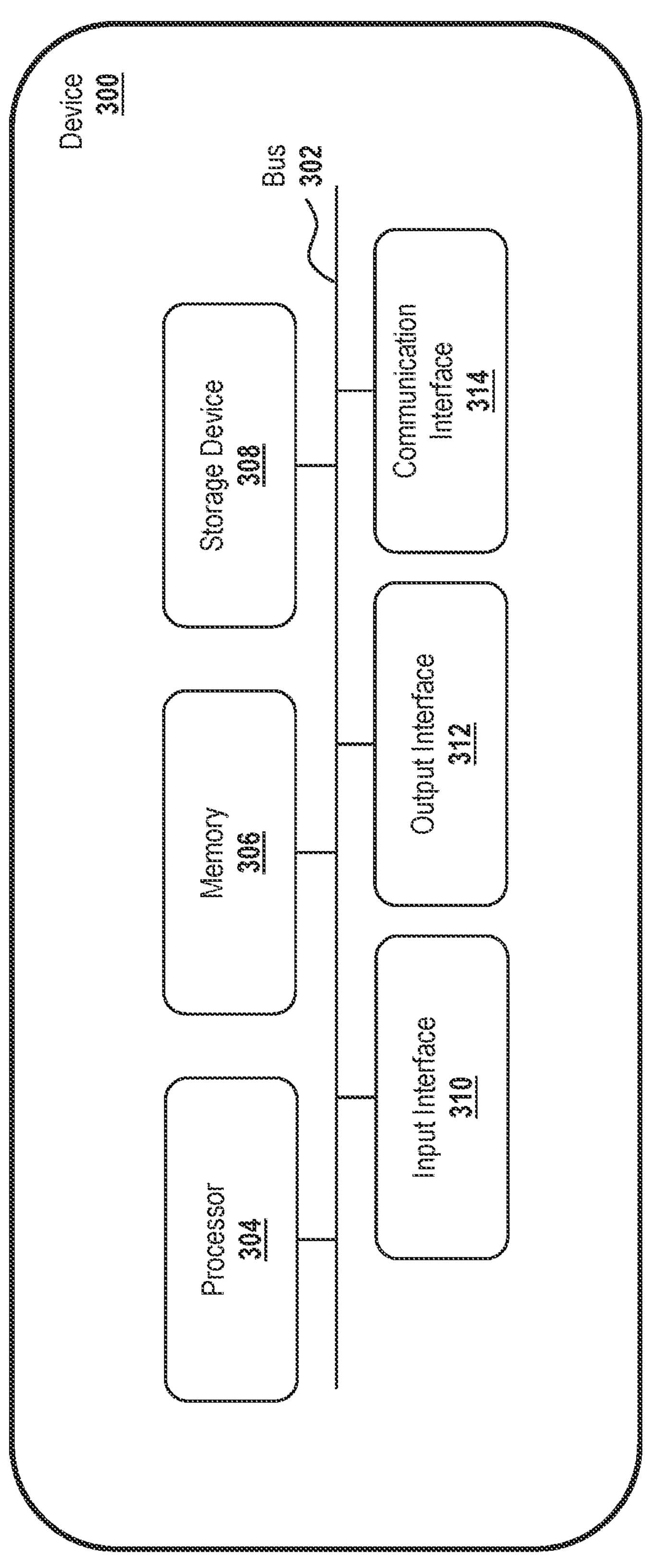
FIG. 3 is a diagram of components of one or more devices and/or one or more systems of FIGS. 1 and 2.

Cameras 202*a* include at least one device configured to be in communication with communication device 202*e*, autonomous vehicle compute 202*f*, and/or safety controller 202*g* via a bus (e.g., a bus that is the same as or similar to bus 302 of FIG. 3). Cameras 202*a* include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202*a* generates camera data as output. In some examples, camera 202*a* generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202*a* includes a plurality of independent cameras configured on (e.g., positioned on) a vehicle to capture images for the purpose of stereopsis (stereo vision). In some examples, camera 202*a* includes a plurality of cameras that generate image data and transmit the image data to autonomous vehicle compute 202*f* and/or a fleet management system (e.g., a fleet management system that is the same as or similar to fleet management system 116 of FIG. 1). In such an example, autonomous vehicle compute 202*f* determines depth to one or more objects in a field of view of at least two cameras of the plurality of cameras based on the image data from the at least two cameras. In some embodiments, cameras 202*a* is configured to capture images of objects within a distance from cameras 202*a* (e.g., up to 100 meters, up to a kilometer, and/or the like). Accordingly, cameras 202*a* include features such as sensors and lenses that are optimized for perceiving objects that are at one or more distances from cameras 202*a*.

In an embodiment, camera 202*a* includes at least one camera configured to capture one or more images associated with one or more traffic lights, street signs and/or other physical objects that provide visual navigation information. In some embodiments, camera 202*a* generates traffic light data associated with one or more images. In some examples, camera 202*a* generates TLD (Traffic Light Detection) data associated with one or more images that include a format (e.g., RAW, JPEG, PNG, and/or the like). In some embodiments, camera 202*a* that generates TLD data differs from other systems described herein incorporating cameras in that camera 202*a* can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202*b* include at least one device configured to be in communication with communication device 202*e*, autonomous vehicle compute 202*f*, and/or safety controller 202*g* via a bus (e.g., a bus that is the same as or similar to bus 302 of FIG. 3). LiDAR sensors 202*b* include a system configured to transmit light from a light emitter (e.g., a laser transmitter). Light emitted by LiDAR sensors 202*b* include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of remote AV system 114, at least one device of fleet management system 116, at least one device of vehicle-to-infrastructure system 118, and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112). In some embodiments, one or more devices of vehicles 102 (e.g., one or more devices of a system of vehicles 102), one or more devices of remote AV system 114, one or more devices of fleet management system 116, one or more devices of vehicle-to-infrastructure system 118, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
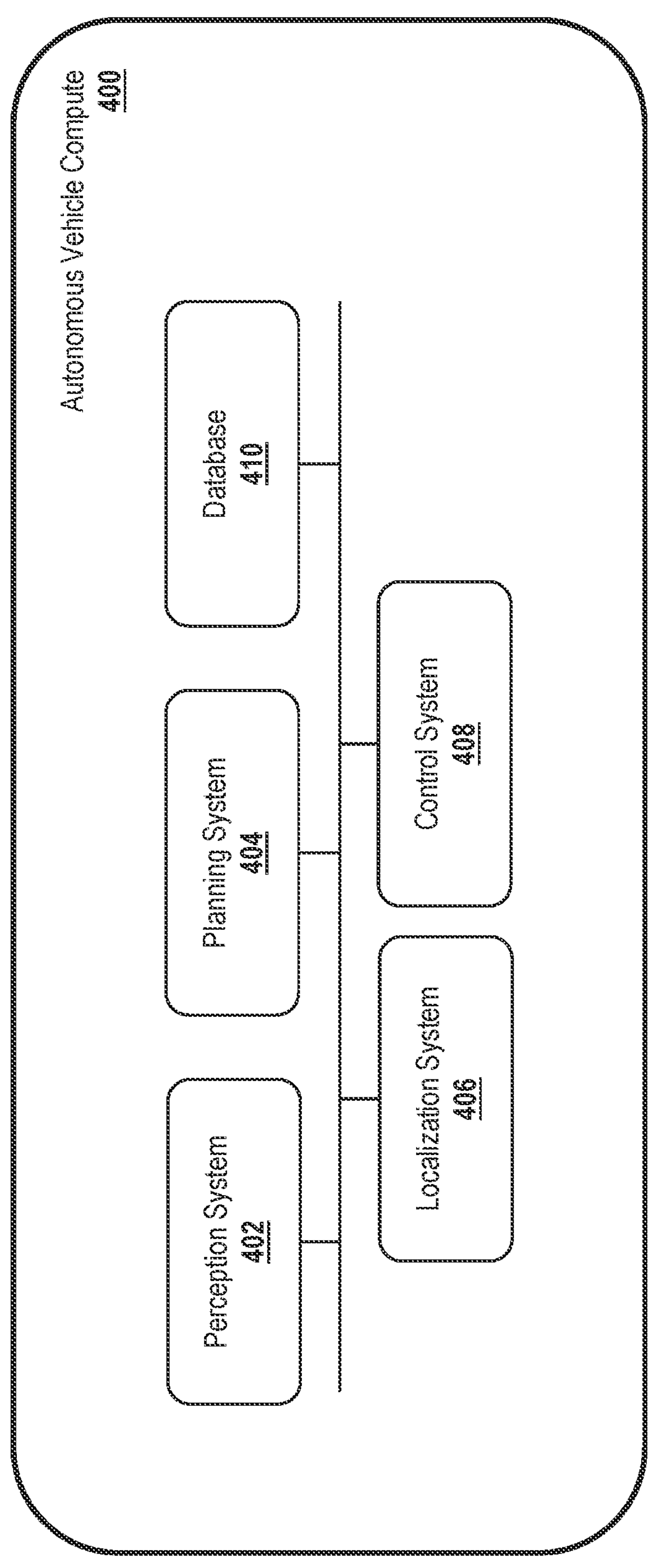
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
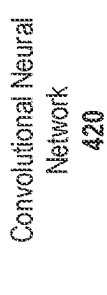
FIG. 4B is a diagram of an implementation of a neural network.
Figure 4B:
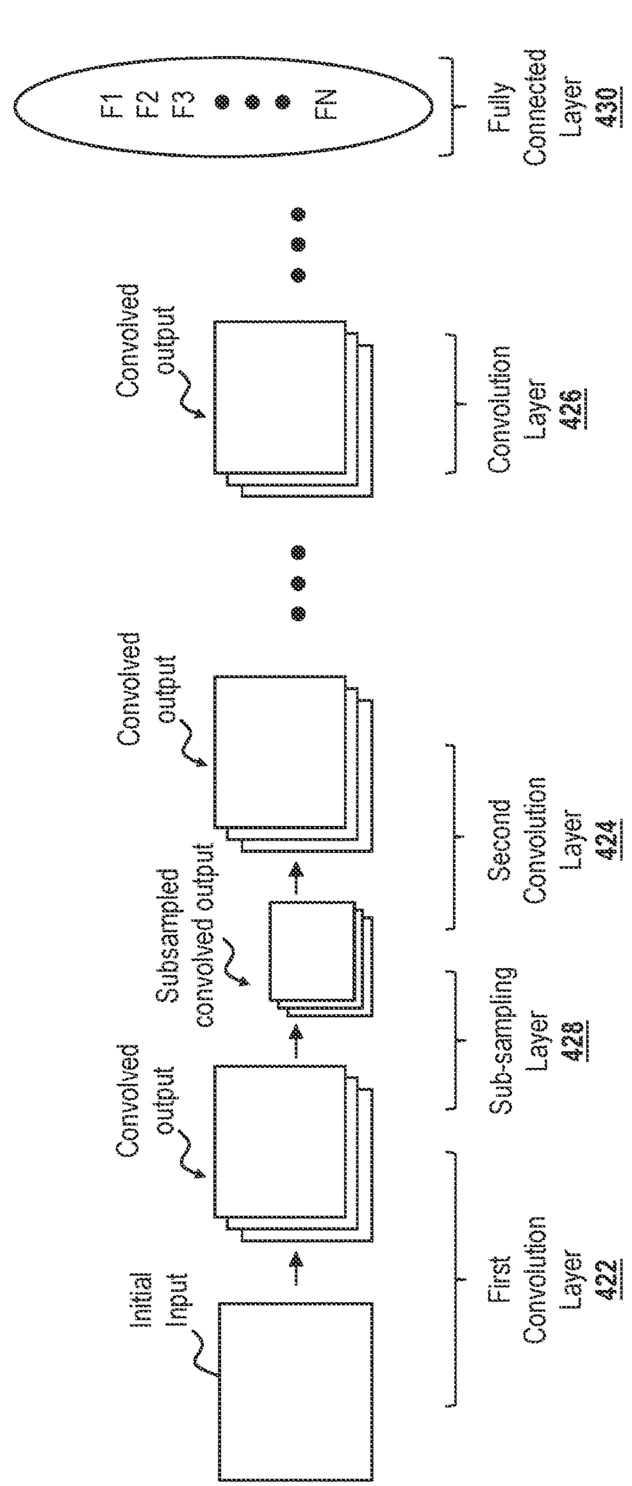

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
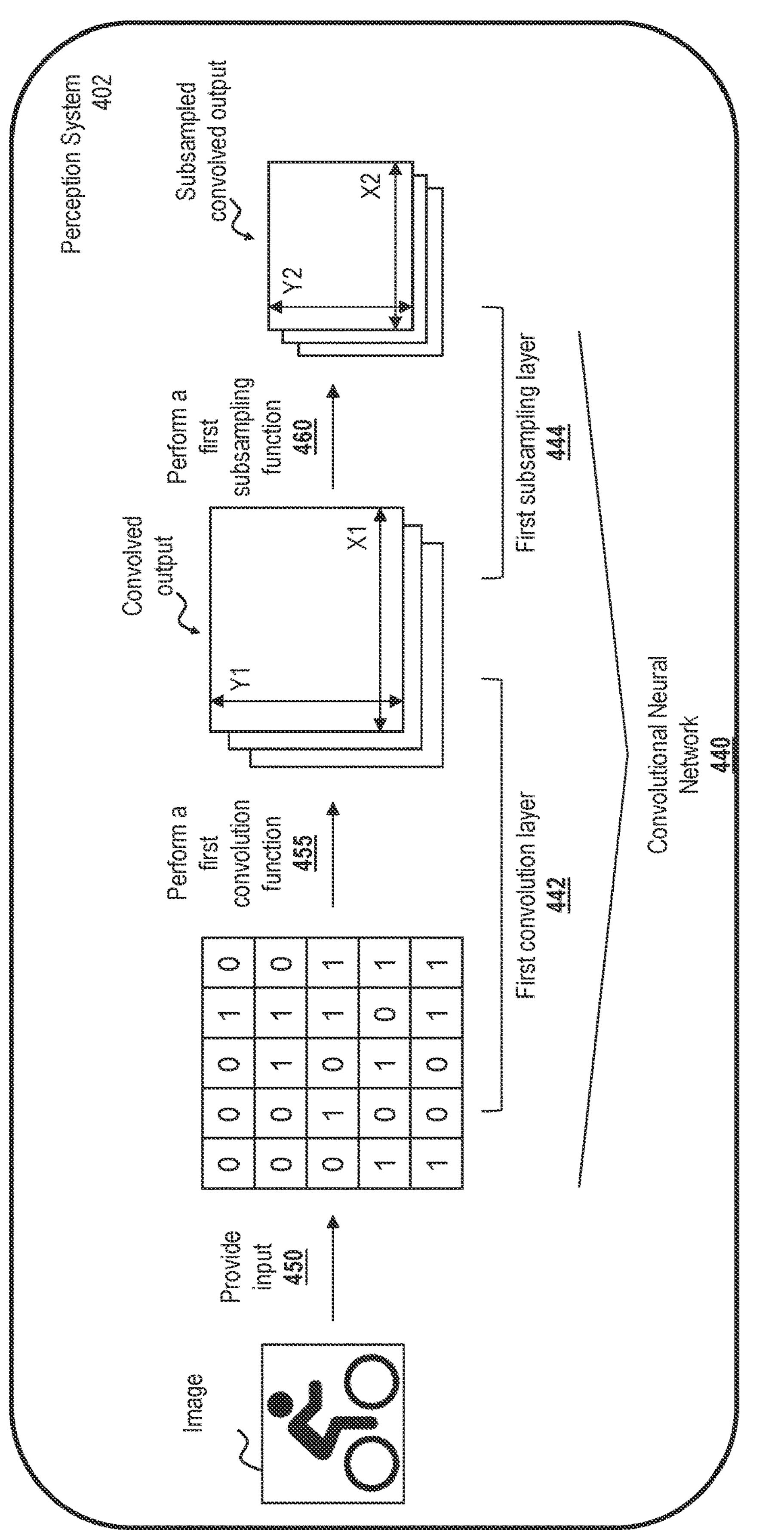
FIGS. 4C and 4D are diagrams illustrating example operations of a CNN.
Figure 4D:
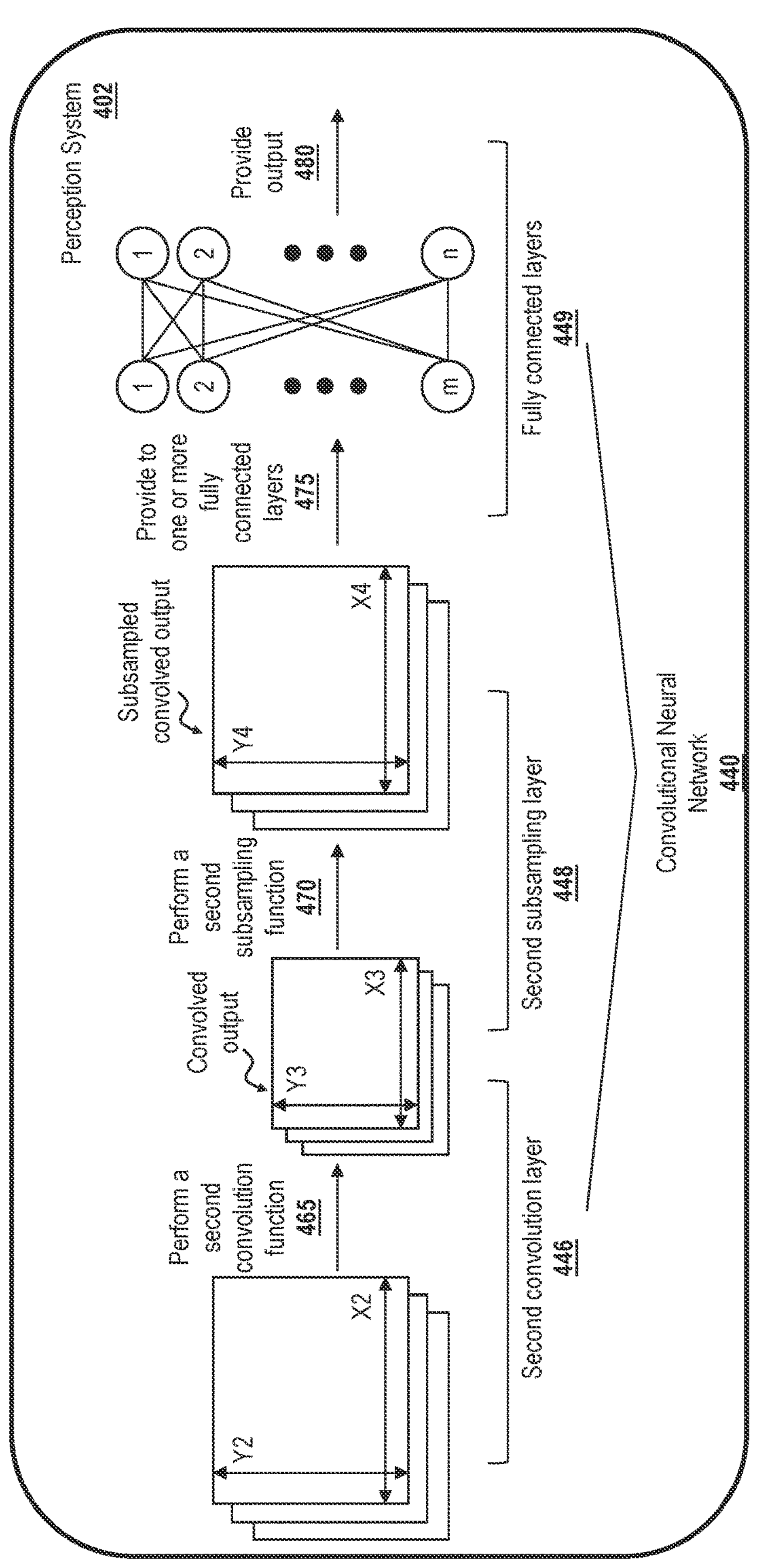

Referring now to FIGS. 4C and 4D, illustrated are diagrams of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5A:
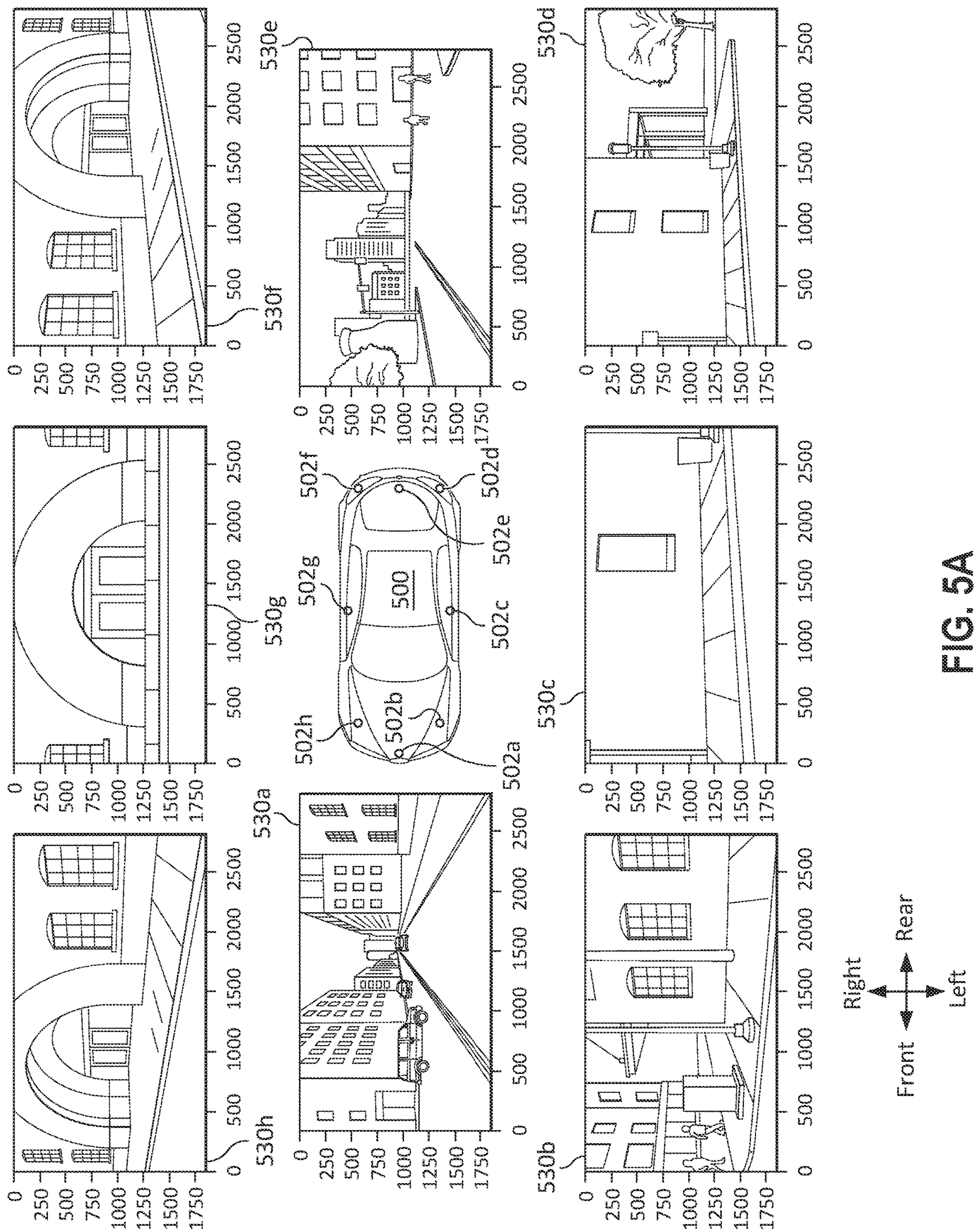
FIG. 5A illustrates a plurality of images captured by vehicle sensors in an implementation of a process for training machine learning networks to control operation of a vehicle.

Referring now to FIGS. 5A-7, illustrated are diagrams of an implementation of techniques for training machine learning networks for controlling vehicle operation. FIG. 5A illustrates a plurality of images captured by sensors of a vehicle 500 in an embodiment of a process for training machine learning networks. Vehicle 500 can be the same as or similar to vehicle 102 of FIG. 1 or vehicle 200 of FIG. 2. As illustrated, the images include eight image frames 530*a*-530*h*, respectively captured by eight sensors 502*a*-502*h* located at different positions on vehicle 500. Sensors 502*a*-502*h* can be cameras (e.g., cameras 202*a*), LiDAR sensors (e.g., LiDAR sensors 202*b*), or other types of sensors used in an autonomous system (e.g., autonomous system 202). The term "image frame" indicates that an image is captured at a given time. Here, image frames 530*a*-530*h* are respectively captured by sensors 502*a*-502*h* at substantially the same time.

Each of image frames 530*a*-530*h* corresponds to a portion of an environment (e.g., area 108) surrounding vehicle 500. For example, image frame 530*a* corresponds to a front portion of the environment as viewed from vehicle 500, image 530*b* corresponds to a front left portion of the environment as viewed from vehicle 500, and image 530*h* corresponds to a front right portion of the environment as viewed from vehicle 500. Together image frames 530*a*-530*h* can represent a holistic (e.g., 360°) view surrounding vehicle 500.

Image frames 530*a*-530*h* are captured by sensors 502*a*-502*h*, respectively. Each of image frames 530*a*-530*h* correspond to portions of the environment in a field of view (FOV) of the sensor that captured that image frame. The FOVs of two or more of sensors 502*a*-502*h* may or may not have the same angle and may or may not overlap. When two adjacent sensors (e.g., 502*a* and 502*b*) have overlapping FOVs, the image frames captured by these two adjacent sensors (e.g. image frames 530*a* and 530*b*) may contain a same (e.g., at least partly overlapping) portion of the environment, though viewed from different angles.

Vehicle 500 can have a perception system (e.g., perception system 402) that implements at least one machine learning network (e.g., CNN 420) to receive and process image frames 530*a*-530*h*. For example, the perception system can receive image frames 530*a*-530*h* and identify objects (e.g., pedestrians, other vehicles, road signs, and barriers) in each image frame. On image frames 530*a*-530*h*, the perception system can mark the identified objects with, e.g., colored boxes, according to the nature, position, and/or movement of the identified objects. The perception system can further generate (e.g., predict), using the at least one machine learning network, a surround (e.g., 360 degree) view the environment of vehicle 500 by merging data obtained from image frames 530*a*-530*h*, removing redundant data due to overlapping FOVs, and reconstructing an estimate of the environment surrounding vehicle 500. In the predicted view of the environment, the perception system can indicate the identified objects using annotations. The perception system can output the prediction outcomes (e.g., result of processing the images frames using the at least one machine learning network, such as data representing the estimated environment and the identified objects) to other systems of vehicle 500, such as planning system 404, localization system 406, and control system 408. In implementations where vehicle 500 has driving assistance capabilities, the prediction outcomes can be used by a processor (e.g., processor 304) for making driving decisions.

In some embodiments, the real environment and the objects surrounding vehicle 500 can be represented by ground truth data. The ground truth data provides an accurate depiction of the environment, while the prediction outcomes represent an estimate of the environment and may have one or more differences compared to the accurate depiction of the environment provided by the ground truth data. For example, for a tree 10 meters tall located 100 meters (m) ahead of vehicle 500, the ground truth data may precisely describe the height, perimeter, and color of the tree, as well as the position of the tree relative the vehicle 500. Conversely, the prediction outcomes may inaccurately describe the tree as 11 m tall and located 105 m from vehicle 500, or may even incorrectly identify the tree as a building. The deviation of prediction outcomes from ground truth data can be measured using metrics such as Mean Average Precision (mAP). Usually, the closer the prediction outcomes match the ground truth data, the higher the mAP of the at least one machine learning network.

When vehicle 500 travels on a road, sensors 502*a*-502*h* periodically capture image frames of the environment, and send the captured image frames to the perception system for processing. The interval between two successive captures can be very short, such as about 200 milliseconds (ms). For various reasons, such as hardware malfunction, external interference, software overload, or transmission latency, sometimes one or more of sensors 502*a*-502*h* may not be able to timely capture all their respective image frames and send the same to the perception system. In these scenarios, the perception system, which expects to receive all eight image frames from all the sensors 502*a*-502*h*, may receive fewer image frames for determining the surround view of the environment. This can reduce the accuracy of prediction using the machine learning network, or even make the machine learning network unable to generate an output. This can adversely affect the robustness of the autonomous system of vehicle 500. The number of missing frames in each imaging capturing cycle is referred to as sensor drop rate. Usually, the higher the sensor drop rate, the lower the accuracy of prediction.

Training the at least one machine learning network in scenarios with missing image frames can improve the accuracy of prediction. As described below with reference to FIG. 5B, the at least one machine learning network can be trained by dividing the ground truth data into multiple subsets, mapping the multiple subsets to sensors 502*a*-502*h*, removing at least one selected subset, and making predictions based on the subsets after the removal.

Figure 5B:
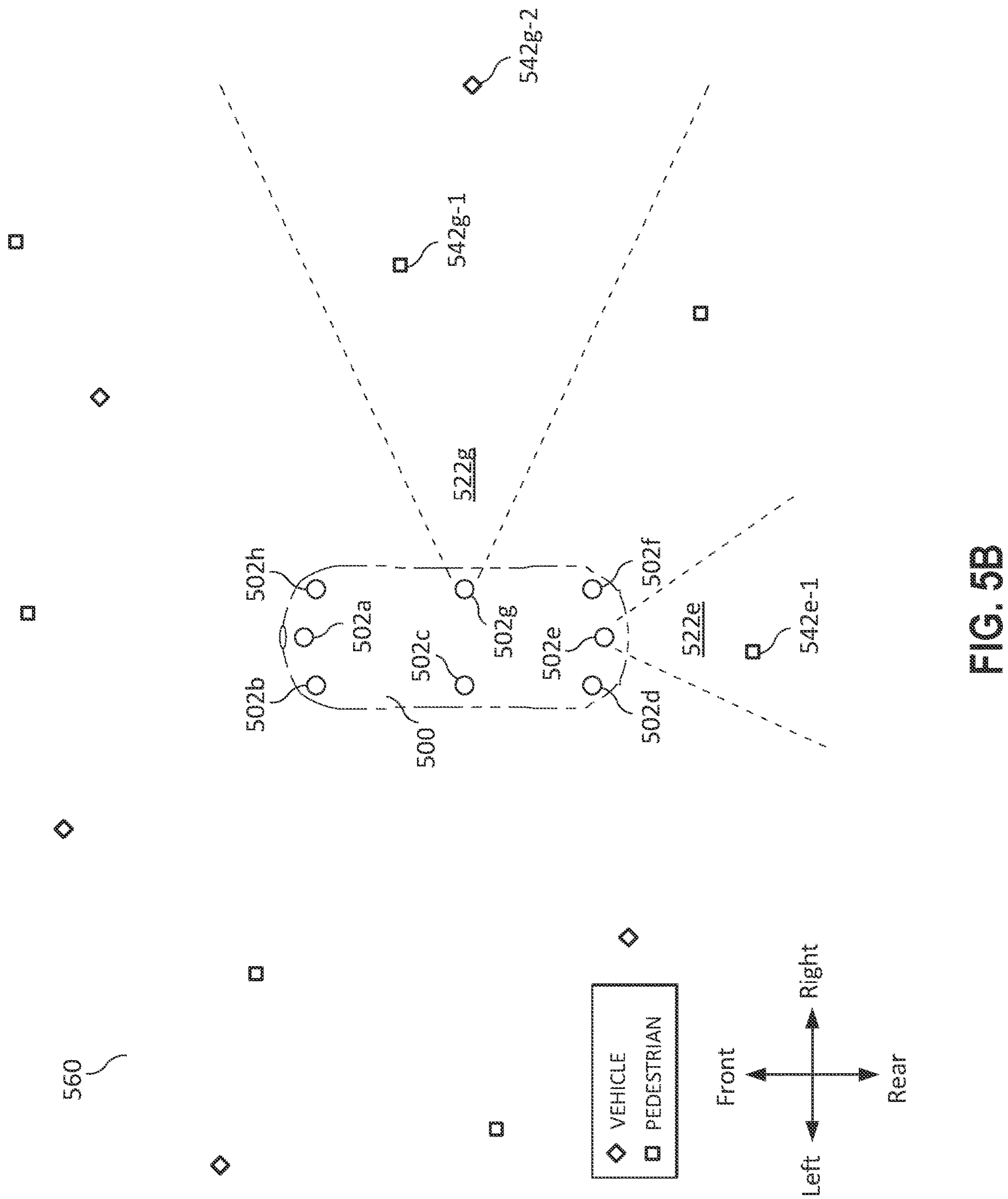
FIG. 5B illustrates an implementation of a process for training one or more machine learning networks to control operation of a vehicle.

FIG. 5B illustrates an implementation of a process for training train one or more machine learning networks for controlling vehicle operation. For simplicity, the description below assumes the process is conducted to train the at least one machine learning network that is used for vehicle 500. The training can be conducted using at least one processor that is part of vehicle 500, such as processor 304. Alternatively or additionally, the training can be conducted using at least one processor that is not part of vehicle 500, such as on an external computer or on a cloud server, to either of which the vehicle 500 can be connected via a wireless or wired network connection. In the following description, references are made to a generic processor, which can be either a processor that is part of the vehicle 500, or a processor that is external to the vehicle 500 as described above. In some embodiments, the processor represents a plurality of processors (which can be on-vehicle processors, or remote processors not on the vehicle, or a combination of both) that are collectively used to train the one or more machine learning networks for use in controlling vehicle operation.

At the outset, the training involves providing ground truth data to the at least one processor that is used to train the machine learning network, where the ground truth data represents environment 560. As described previously, the ground truth data can be extracted from images of a real environment captured by cameras or other types of sensors, such as those installed on vehicle 500 or other vehicles. The ground truth data can also be extracted from images that simulate an environment (e.g., based on data generated synthetically or experimentally).

The ground truth data can be formatted according to a variety of data structures, as compatible with the processor. For example, the ground truth data can include a bitmap, such as a map of pixels, that represents a 2-dimension image. As another example, the ground truth data can include binary code that describes the nature, size, boundaries, and coordinates of objects within a geographical area. In some cases, in addition to describing static distribution of objects in environment 560, the ground truth data can include information that describes dynamic movement of the objects.

In some cases, for the purpose of training, environment 560 represented by the ground truth data is not limited to a road or areas that typically have vehicle traffic (e.g., a parking lot), but can include other types of areas, such as a town square, a field, a playground, a park, a port, or a beach. Training machine learning networks with ground truth data of different types of environments can improve the machine learning networks' ability to identify objects of different types, increase the robustness of the machine learning networks, and make the machine learning networks deployable (e.g., useable in real vehicle operations) in complicated environments.

After receiving the ground truth data, the processor can map the ground truth data to the sensors of vehicle 500. For example, the processor can divide the ground truth data into eight subsets and associate each subset with one of sensors 502*a*-502*h*. Each subset can represent a portion of environment 560 that corresponds to the FOV (perception region) of the associated sensor. In the example illustrated in FIG. 5B, sensor 502*g* is mapped to a subset of the ground truth data that corresponds to perception region 522*g*. Similarly, sensor 502*e* is mapped to a subset of the ground truth data that corresponds to perception region 522*e*. The other sensors can be similarly mapped to other subsets that correspond to other perception regions of environment 560. In this manner, the mapping creates an association between each perception region and a position of the corresponding sensor. For example, mapping sensor 502*g* to perception region 522*g* creates an association between perception region 522*g* and the middle right position of vehicle 500. The perception regions respectively corresponding to sensors 502*a*-502*h* may or may not overlap.

In some embodiments, to train the at least one machine learning network in scenarios with at least one missing image frame, the processor first determines the sensor drop rate in the training scenarios. The processor can make the determination based on empirical data obtained from real road travels and/or based on results of simulated road travels. For example, the empirical data or the simulation results can indicate that, under daytime urban road conditions and with standard quality of sensors, a vehicle traveling at a speed of 60 kilometer per hour (km/h) with a frame rate of 5 hertz (Hz) (e.g., five image captures per second) has a probably of 60% to have a sensor drop rate less than or equal to 1, has a probably of 80% to have a sensor drop rate less than or equal to 2, and has a probably of 95% to have a sensor drop rate less than or equal to 3. Accordingly, the processor can determine to train the at least one machine learning network with the sensor drop rate that follows substantially the same statistic distribution as indicated by the empirical data or the simulation results. For example, in 60% of the trainings, the processor can provide the at least one machine learning network with data having no missing image frames or with one missing frame; in 80% of the trainings, the processor can provide the at least one machine learning network with data having one or two missing image frames; and in 95% of the trainings, the processor can provide the at least one machine learning network with data having no greater than three missing frames.

Figure 5C:
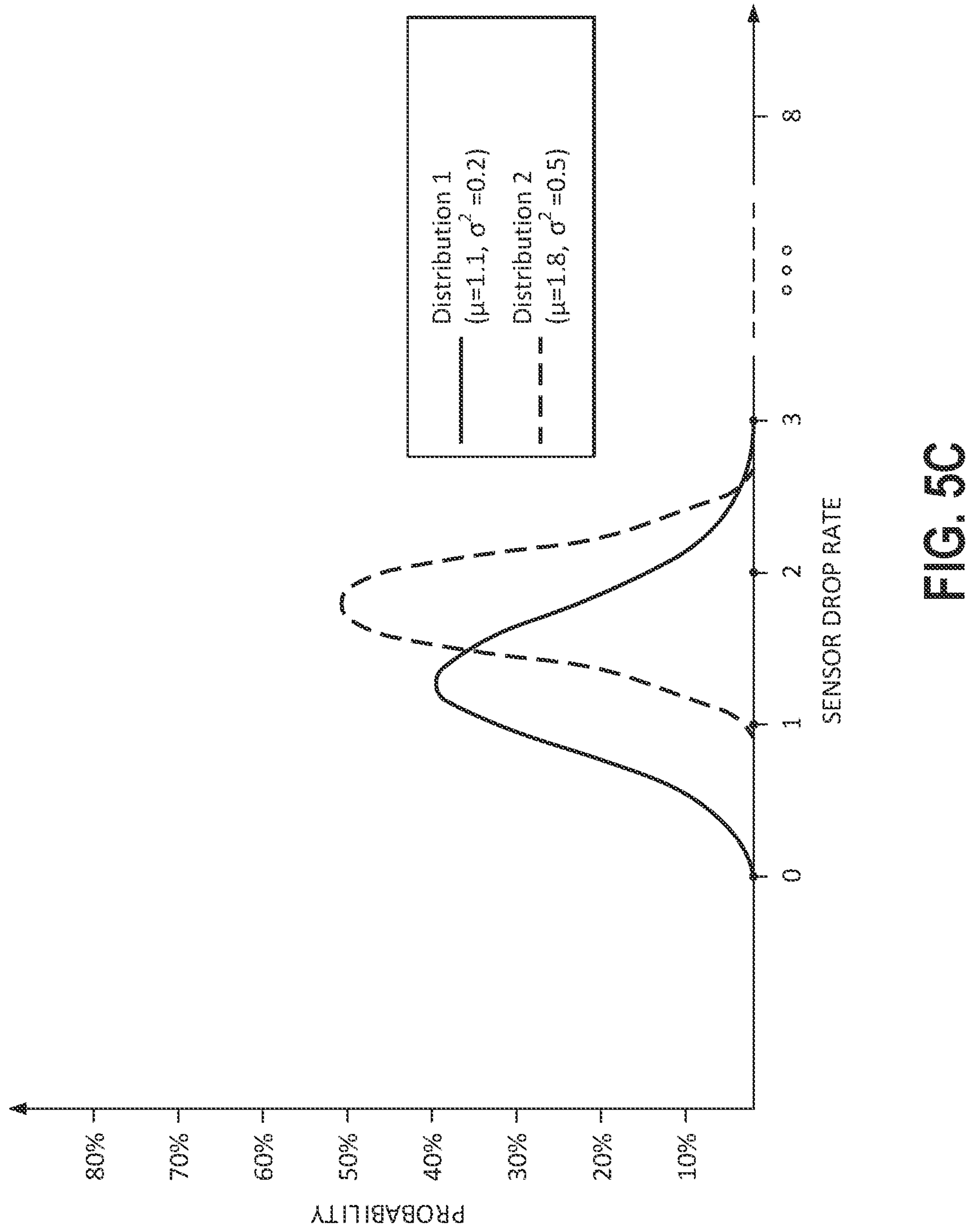
FIG. 5C illustrates example distributions of sensor drop rate in training scenarios of machine learning networks to control operation of a vehicle.

FIG. 5C illustrates example distributions of sensor drop rate in training scenarios of machine learning networks. In some implementations, the empirical data or the simulation results indicate that the sensor drop rate substantially follows a Gaussian distribution, characterized by a mean value u and a standard deviation value $\sigma^2$. Accordingly, the processor can be configured to use the same mean value $\mu$ and standard deviation value $\sigma^2$ to determine the sensor drop rate in the training scenarios.

As illustrated in FIG. 5C, in some cases, the empirical data or simulation results can indicate that the sensor drop rate follows Gaussian distribution 1 with $\mu=1.1$ and $\sigma^2=0.2$. In such cases, the processor can accordingly train the at least one machine learning network with sensor drop rates that follow the distribution 1. In some other cases, the empirical data or simulation results can indicate that the sensor drop rate follows Gaussian distribution 2 with $\mu=1.8$ and $\sigma^2=0.5$. For such cases, the processor can accordingly train the at least one machine learning network with sensor drop rates that follow distribution 2.

After determining the sensor drop rate for each training scenario, the processor selects which sensor(s) among sensors 502*a*-502*h* will drop, e.g., fail to timely provide an image frame to the perception system. In some cases, the processor can make the selection randomly. In scenarios where certain sensor(s) are more or less prone to failure than other sensors (e.g., due to age or quality), the processor can be configured to give this (these) sensor(s) more or less weight in the randomization, such that the training scenarios closely simulate reality. In some cases, in addition to or as an alternative to random selection, the processor can be configured to select specific sensor(s) to create targeted training scenarios.

After sensor selection, the processor removes the subset (s) of ground truth data corresponding to the selected sensor(s) to create training data subsets. The removal of the subset(s) corresponding to the selected sensor(s) is to simulate the sensor drop in the training scenarios. The removal can involve, e.g., marking the subset(s) as unavailable, applying a mask to all identified objects from the subset(s), or removing the annotations of all identified objects in the corresponding image frame(s). For objects that extend over multiple image frames, the removal may apply only to the portion of the objects in the missing image frames.

As an example, assuming the processor selects sensor 502*g* in a training scenario with image frame 530*g* missing, the processor can remove the annotations of identified objects 542*g*-1 and 542*g*-2, which correspond to a pedestrian and a vehicle, respectively, in the ground truth data. Accordingly, unless objects 542*g*-1 and 542*g*-2 are also identified in other image frames that overlap image frame 530*g*, the prediction performed by the at least one machine learning network does not rely on data of objects 542*g*-1 and 542*g*-2 in the training datasets.

Ideally, the prediction should recover objects 542*g*-1 and 542*g*-2 in the estimated environment from the missing image frame 530*g*, even when data representing these objects are absent in the training datasets. However, because the prediction does not rely on data objects 542*g*-1 and 542*g*-2 in image frame 530*g*, the estimated environment may not always be able to recover objects 542*g*-1 and 542*g*-2 exactly as they are in the ground truth data. Thus, the processor can use the difference between the estimated environment and environment 560 represented by the ground truth data as the goal of training the at least one machine learning network. For example, the processor can measure an area occupied by identified objects in perception region 522*g*, a numbers of identified objects in perception region 522*g*, a distance between vehicle 500 and the closest identified object in perception region 522*g*, or a relative movement between vehicle 500 and the closest identified object in perception region 522*g*. The processor can compare at least one of these measurements with the ground truth data and obtain a difference. The processor can provide the difference to the at least one machine learning network after each training iteration such that the at least one machine learning network can improve its capability of prediction. After one or more rounds of training using one or more training datasets (which include various combinations of subsets of ground truth data), the capability of the at least one machine learning network to predict the environment surrounding vehicle 500, in the absence of data from one or more sensors, is improved.

Depending on the underlying machine learning model (e.g., MLP, CNN, RNN, etc.), different machine learning networks can exhibit different performance of prediction after the training. Accordingly, in some embodiments, different trained machine learning networks are evaluated, and one or more of these networks that have prediction performance meeting target thresholds are selected for deployment. Implementations of a process for evaluating trained machine learning networks are described below with reference to FIG. 6. For simplicity, the below description assumes the evaluation is performed on trained machine learning networks to be deployed on vehicle 500.

Figure 6:
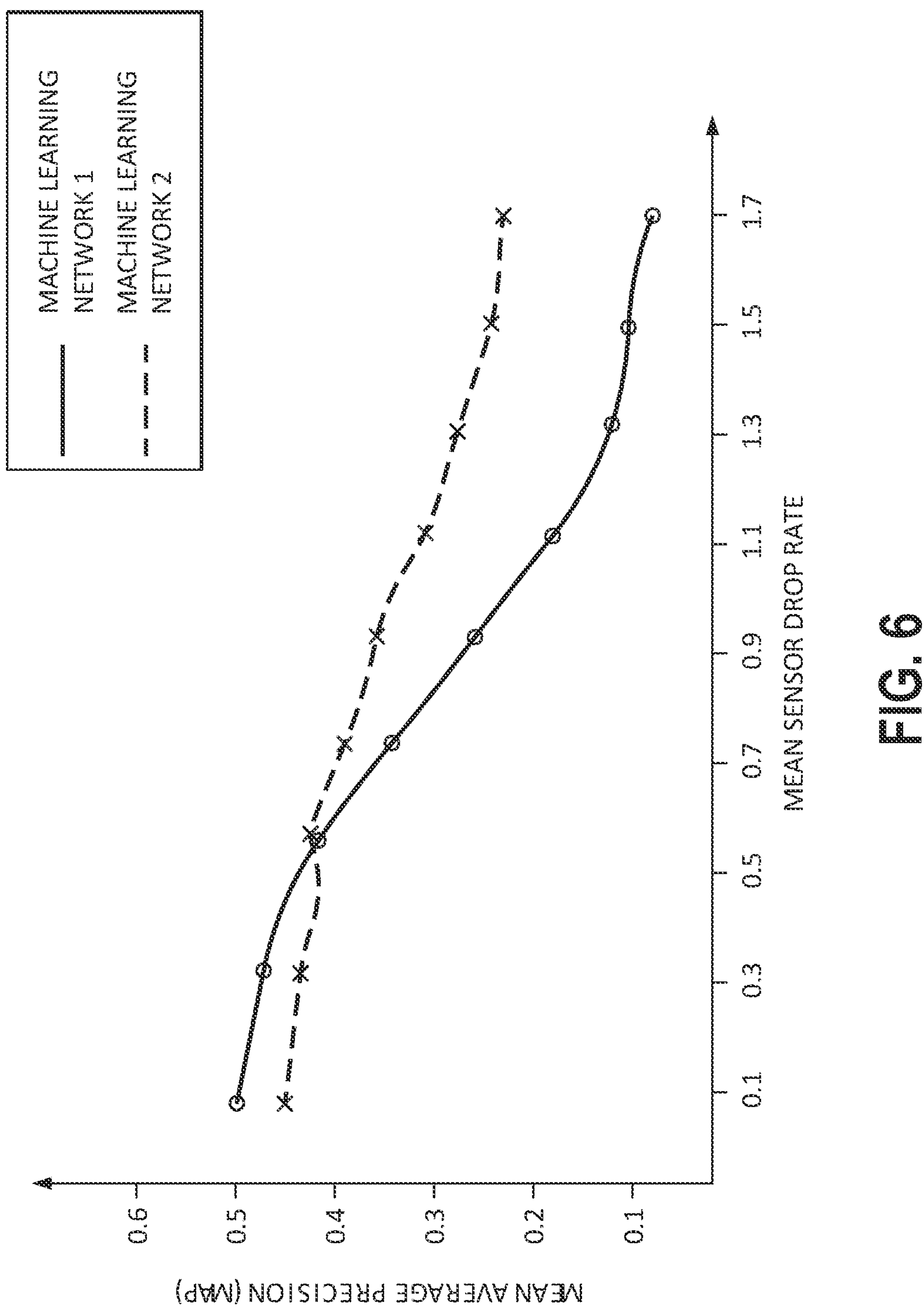
FIG. 6 illustrates curves for evaluating machine learning networks in some implementations.

FIG. 6 illustrates curves showing the performance of two machine learning networks that have been trained using the disclosed techniques. The performance of a trained machine learning network can be obtained from road testing or from simulation. In the illustrated graph of FIG. 6, the horizontal axis represents the mean sensor drop rate observed under a given condition of testing or simulation. The vertical axis represents prediction accuracy, as measured by normalized mAP. Accordingly, each sample point on a curve represents the prediction performance of a corresponding machine learning network when deployed under a given condition. For example, when deployed under a condition that on average causes about 0.1 missing image frames, both machine learning networks exhibit a normalized mAP of about 0.45 to 0.5. However, when deployed under a condition that on average causes about 1.5 missing image frames, the performance of machine learning network 1 (represented by the solid line) decreases significantly with an mAP of about 0.1, while the performance of machine learning network 2 (represented by the dashed line) decreases less dramatically with an mAP of about 0.3. FIG. 6 indicates that machine learning network 1 slightly outperforms machine learning network 2 under conditions with very low sensor drop rates, but underperforms machine learning network 2 as sensor drop rates become higher.

In real scenarios, the sensor drop rate may be unknown prior to deployment of machine learning networks, and may vary during the deployment as the condition changes.

Accordingly, it is desirable to have a generalized metric for evaluating the performance of machine learning networks.

In some implementations, the evaluation of the performance of the trained machine learning networks is based on calculating an area under the curve representing a function of (i) the mAP of predictions with respect to (ii) a mean sensor drop rate. In the example of FIG. 6, the respective performance of machine learning networks 1 and 2 is evaluated based on calculating the area under the solid line curve and the area under the dashed line curve. The calculation is mathematically equivalent to calculating an integration of the function represented by each curve. In some implementations, the performance of a machine learning network is evaluated by calculating the integration of the function, without the need of visually plotting the curve. The evaluation can be carried out by one or more processors described with reference to FIG. 5B, or by any other suitable processor (which can be, e.g., on vehicle 500, or coupled to vehicle 500, or independent to vehicle 500).

According to the evaluation, a large integration value of the function (e.g., a large area under the curve) can indicate good performance of the corresponding machine learning network. By comparing the integration values of two or more machine learning networks, a machine learning network that corresponds to the largest integration value can be selected for deployment. In the example of FIG. 6, because the area under the dashed line curve is greater than that under the solid line curve, machine learning network 2 is determined to generally outperform machine learning network 1. Accordingly, in some cases, machine learning network 2 is selected over machine learning network 1 for deployment. In some cases where three or more machine learning networks are evaluated, more than one can be selected for deployment if the performance of the selected ones meets a threshold.

Figure 7A:
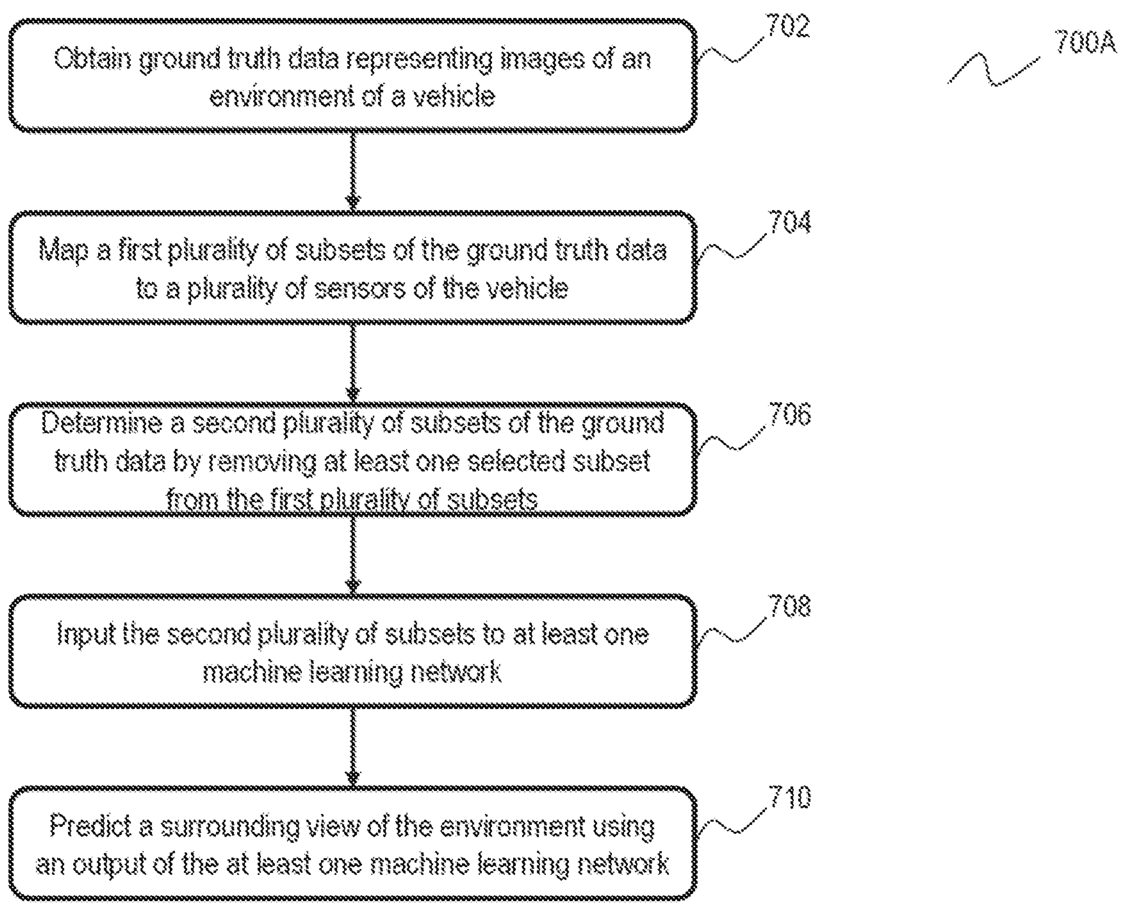
FIG. 7A is a flowchart of an implementation of a process for training machine learning networks to control operation of a vehicle.

Referring now to FIG. 7A, illustrated is a flowchart of a process 700A for training machine learning networks to control operation of a vehicle. In some implementations, one or more of the steps described with respect to process 700A are performed (e.g., completely, partially, and/or the like) by at least one processor of autonomous system 202. Alternatively or additionally, one or more of the steps described with respect to process 700A are performed (e.g., completely, partially, and/or the like) by at least one processor of a different system, either on a vehicle or external to the vehicle.

At 702, ground truth data is obtained that represents images of an environment of a vehicle. The environment can be, e.g., environment 100 that surrounds vehicle 500. The ground truth data can be similar to that described with reference to FIG. 5B.

At 704, a first plurality of subsets of the ground truth data is mapped to a plurality of sensors of the vehicle. The plurality of sensors can be, e.g., sensors 502*a*-502*h*. The mapping includes determining a plurality of perception regions of the environment from the ground truth data, wherein each of the plurality of perception regions is associated with one of a plurality of sensors (e.g., perception region 522*g* is associated with sensor 502*g*). The mapping includes associating the first plurality of subsets with the plurality of perception regions. A subset of the ground truth data that represents image frames corresponding to (e.g., captured by) a particular sensor of the vehicle is associated with the perception region associated with the particular sensor. For example, a subset of ground truth data that represents image frames captured by sensor 502*g* is associated with perception region 522*g*.

At 706, a second plurality of subsets of the ground truth data is determined by removing at least one selected subset from the first plurality of subsets. The second plurality of subsets can be obtained by, e.g., removing the annotations of identified objects 542*g*-1 and 542*g*-2 from image frame 530*g*.

At 708, the second plurality of subsets is input to at least one machine learning network to train the at least one machine learning network to make predictions. For example, a portion of the ground truth data that is less than the entirety of the ground truth data is input to a machine learning network to train the machine learning network to estimate a surround view of the environment.

At 710, based on an output (e.g., a prediction outcome) of the at least one machine learning network, a surrounding view of the environment is predicted (e.g., estimated).

Figure 7B:
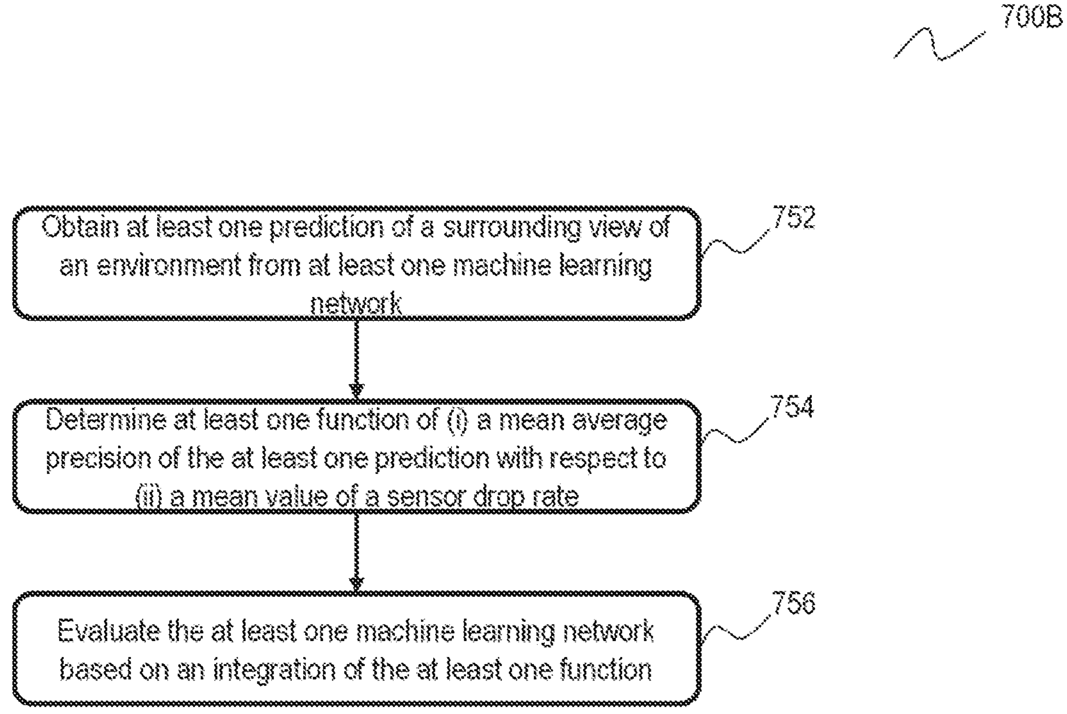
FIG. 7B is a flowchart of an implementation of a process for evaluating machine learning networks to control operation of a vehicle.

Referring now to FIG. 7B, illustrated is a flowchart of a process 700B for evaluating machine learning networks to control operation of a vehicle. In some implementations, one or more of the steps described with respect to process 700B are performed (e.g., completely, partially, and/or the like) by at least one processor of autonomous system 202. Alternatively or additionally, one or more of the steps described with respect to process 700B are performed (e.g., completely, partially, and/or the like) by at least one processor of a different system, either on a vehicle or external to the vehicle.

At 752, at least one prediction of a surrounding view of an environment is obtained from at least one machine learning network, such as at least one machine learning network trained according to process 700A.

At 754, at least one function is determined to represent (i) a mAP of the at least one prediction with respect to (ii) a mean value of a sensor drop rate. The at least one function can be visibly plotted as at least one curve, such as those in FIG. 6.

At 756, the at least one machine learning network is evaluated based on an integration of the at least one function. The integration can be obtained by calculating an area under at least one curve. In implementations where multiple machine learning networks are evaluated, the multiple machine learning networks can be compared. The machine learning network whose prediction corresponds to the largest integration value can be determined to deliver the best performance among the multiple.

According to some non-limiting embodiments or examples, provided is a vehicle, comprising: a plurality of sensors; a memory storing computer-executable instructions; and at least one processor communicatively coupled to the plurality of sensors and the memory. The at least one processor is configured to control at least one machine learning network. The at least one processor is configured to execute the computer-executable instructions to perform operations comprising: obtaining ground truth data representing images of an environment of a vehicle; mapping the first plurality of subsets to the plurality of sensors by: determining, from the ground truth data, a plurality of perception regions of the environment, wherein each of the plurality of perception regions is associated with one of a plurality of sensors; and associating the plurality of subsets with the plurality of perception regions; determining a second plurality of subsets of the ground truth data by removing at least one selected subset from the first plurality of subsets; inputting the second plurality of subsets to at least one machine learning network; and predicting, from the at least one machine learning network, a surrounding view of the environment.

According to some non-limiting embodiments or examples, provided is at least one non-transitory computer-readable medium comprising one or more instructions that, when executed by at least one processor, cause the at least one processor to perform functions one or more operations including: obtaining, by a processor, ground truth data representing images of an environment of a vehicle; determining, by the processor, a first plurality of subsets of the ground truth data; mapping the first plurality of subsets to a plurality of sensors by: determining, by the processor, a plurality of perception regions of the environment from the ground truth data, wherein each of the plurality of perception regions is associated with one of the plurality of sensors; and associating, by the processor, the first plurality of subsets with the plurality of perception regions; determining, by the processor, a second plurality of subsets of the ground truth data by removing at least one selected subset from the first plurality of subsets; inputting, by the processor, the second plurality of subsets to at least one machine learning network; and predicting, by the processor, a surrounding view of the environment using an output of the at least one machine learning network.

According to some non-limiting embodiments or examples, provided is a method, comprising: executing, by/using at least one processor, one or more operations including obtaining, by a processor, ground truth data representing images of an environment of a vehicle; determining, by the processor, a first plurality of subsets of the ground truth data; mapping the first plurality of subsets to a plurality of sensors by: determining, by the processor, a plurality of perception regions of the environment from the ground truth data, wherein each of the plurality of perception regions is associated with one of the plurality of sensors; and associating, by the processor, the first plurality of subsets with the plurality of perception regions; determining, by the processor, a second plurality of subsets of the ground truth data by removing at least one selected subset from the first plurality of subsets; inputting, by the processor, the second plurality of subsets to at least one machine learning network; and predicting, by the processor, a surrounding view of the environment using an output of the at least one machine learning network.

Further non-limiting aspects or embodiments are set forth in the following numbered clauses:

Clause 1: A method, comprising: obtaining, by a processor, ground truth data representing images of an environment of a vehicle; determining, by the processor, a first plurality of subsets of the ground truth data; mapping the first plurality of subsets to a plurality of sensors by: determining, by the processor, a plurality of perception regions of the environment from the ground truth data, wherein each of the plurality of perception regions is associated with one of the plurality of sensors; and associating, by the processor, the first plurality of subsets with the plurality of perception regions; determining, by the processor, a second plurality of subsets of the ground truth data by removing at least one selected subset from the first plurality of subsets; inputting, by the processor, the second plurality of subsets to at least one machine learning network; and predicting, by the processor, a surrounding view of the environment using an output of the at least one machine learning network.

Clause 2: The method of clause 1, wherein the plurality of sensors comprise at least one of: cameras, or Light Detection and Ranging (LiDAR) sensors.

Clause 3: The method of clause 1 or 2, further comprising determining, by the processor, a plurality of positions on the vehicle corresponding to the plurality of sensors, wherein associating the plurality of subsets with the plurality of perception regions comprises: associating the plurality of perception regions with the plurality of positions.

Clause 4: The method of any of clauses 1 to 3, further comprising: obtaining, by the processor from a memory, at least one image captured by at least one sensor; and generating, by the processor, the ground truth data using the obtained at least one image.

Clause 5: The method of any of clauses 1 to 4, wherein: the first plurality of subsets have a plurality of annotations corresponding to a plurality of objects in the environment, and removing the at least one selected subset comprises removing at least one annotation from the at least one selected subset.

Clause 6: The method of any of clauses 1 to 5, wherein removing at least one selected subset from the first plurality of subsets comprises: obtaining, from a memory, data of a sensor drop rate; and randomly selecting, by the processor, a number of sensors from the plurality of sensors according to the data of the sensor drop rate.

Clause 7: The method of clause 6, wherein the data of the sensor drop rate follows a Gaussian distribution.

Clause 8: The method of any of clauses 1-7, wherein each of the plurality of perception regions is uniquely associated with one of the plurality of sensors.

Clause 9: The method of any of clauses 1-8, wherein determining the second plurality of subsets of the ground truth data by removing at least one selected subset from the first plurality of subsets comprises: selecting at least one sensor of the plurality of sensors as being nonfunctional; identifying a subset of the ground truth data associated with the non-functional sensor; and determining the second plurality of subsets by removing the identified subset of ground truth data.

Clause 10: The method of any of clauses 1-9, further comprising: evaluating, by the processor, the at least one machine learning network based on the prediction.

Clause 11: The method of clause 10, wherein evaluating the at least one machine learning network comprises: determining, by the processor, at least one function of (i) a mean average precision of the prediction with respect to (ii) a mean value of a sensor drop rate; and evaluating the at least one machine learning network based on an integration of the at least one function.

Clause 12: The method of clause 11, wherein evaluating the at least one machine learning network based on the integration of the at least one function comprises: generating at least one curve of the at least one function; and calculating, by the processor, an area under the at least one curve.

Clause 13: The method of clause 12, wherein the at least one machine learning network comprises a first machine learning network and a second machine learning network, the method further comprising: comparing, by the processor, (iii) a first area under a first curve corresponding to the first machine learning network and (iv) a second area under a second curve corresponding to the second machine learning network; and selecting, by the processor, one of the first and the second machine learning networks based on the comparison for deployment in one or more vehicles.

Clause 14: A vehicle, comprising: a plurality of sensors; a memory storing computer-executable instructions; and at least one processor communicatively coupled to the plurality of sensors and the memory, wherein the at least one processor is configured to control at least one machine learning network, and wherein the at least one processor is configured to execute the computer-executable instructions to perform operations comprising: obtaining ground truth data representing images of an environment of a vehicle; mapping the first plurality of subsets to the plurality of sensors by: determining, from the ground truth data, a plurality of perception regions of the environment, wherein each of the plurality of perception regions is associated with one of a plurality of sensors; and associating the plurality of subsets with the plurality of perception regions; determining a second plurality of subsets of the ground truth data by removing at least one selected subset from the first plurality of subsets; inputting the second plurality of subsets to at least one machine learning network; and predicting, from the at least one machine learning network, a surrounding view of the environment.

Clause 15: The vehicle of clause 14, wherein the plurality of sensors comprise at least one of: cameras, or Light Detection and Ranging (LiDAR) sensors.

Clause 16: The vehicle of clause 14 or 15, the operations further comprising: determining, by the processor, a plurality of positions on the vehicle corresponding to the plurality of sensors, wherein associating the plurality of subsets with the plurality of perception regions comprises: associating the plurality of perception regions with the plurality of positions.

Clause 17: The vehicle of any of clauses 14-16, wherein removing at least one selected subset from the first plurality of subsets comprises: obtaining, from a memory, data of a sensor drop rate; and randomly selecting, by the processor, a number of sensors from the plurality of sensors according to the data of the sensor drop rate.

Clause 18: The vehicle of any of clauses 14-17, the operations further comprising: evaluating, by the processor, the at least one machine learning network based on the prediction.

Clause 19: The vehicle of clause 18, wherein evaluating the at least one machine learning network comprises: determining, by the processor, at least one function of (i) a mean average precision of the prediction with respect to (ii) a mean value of a sensor drop rate; and evaluating the at least one machine learning network based on an integration of the at least one function.

Clause 20: A non-transitory computer-readable storage medium comprising at least one program for execution by at least one processor of a device, the at least one program including instructions which, when executed by the at least one processor, cause the device to perform the method of any of clauses 1-14.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:

obtaining, by a processor, ground truth data representing images of an environment of a vehicle;

determining, by the processor, a first plurality of subsets of the ground truth data;

mapping the first plurality of subsets to a plurality of sensors by:

determining, by the processor, a plurality of perception regions of the environment from the ground truth data, wherein each of the plurality of perception regions is associated with one of the plurality of sensors; and associating, by the processor, the first plurality of subsets with the plurality of perception regions;

determining, by the processor, a second plurality of subsets of the ground truth data by removing at least one subset from the first plurality of subsets, wherein removing at least one subset comprises:

obtaining, from a memory, data of a sensor drop rate; and randomly selecting, by the processor, a number of sensors from the plurality of sensors according to the data of the sensor drop rate;

inputting, by the processor, the second plurality of subsets to at least one machine learning network; and predicting, by the processor, a surrounding view of the environment using an output of the at least one machine learning network.

2. The method of claim 1, wherein the plurality of sensors comprise at least one of: cameras, or Light Detection and Ranging (LiDAR) sensors.

3. The method of claim 1, further comprising determining, by the processor, a plurality of positions on the vehicle corresponding to the plurality of sensors, wherein associating the first plurality of subsets with the plurality of perception regions comprises:

associating the plurality of perception regions with the plurality of positions.

4. The method of claim 1, further comprising:

obtaining, by the processor from a memory, at least one image captured by at least one sensor; and generating, by the processor, the ground truth data using the obtained at least one image.

5. The method of claim 1, wherein:

the first plurality of subsets have a plurality of annotations corresponding to a plurality of objects in the environment, and removing the at least one subset comprises removing at least one annotation from the at least one selected subset.

6. The method of claim 1, wherein the data of the sensor drop rate follows a Gaussian distribution.

7. The method of claim 1, wherein each of the plurality of perception regions is uniquely associated with one of the plurality of sensors.

8. The method of claim 1, wherein determining the second plurality of subsets of the ground truth data by removing at least one subset from the first plurality of subsets comprises:

selecting at least one sensor of the plurality of sensors as being nonfunctional;

identifying a subset of the ground truth data associated with the at least one sensor that is selected as being nonfunctional; and determining the second plurality of subsets by removing the identified subset of ground truth data.

9. The method of claim 1, further comprising: evaluating, by the processor, the at least one machine learning network based on the prediction.

10. The method of claim 9, wherein evaluating the at least one machine learning network comprises:

determining, by the processor, at least one function of (i) a mean average precision of the prediction with respect to (ii) a mean value of a sensor drop rate; and evaluating the at least one machine learning network based on an integration of the at least one function.

11. The method of claim 10, wherein evaluating the at least one machine learning network based on the integration of the at least one function comprises:

generating at least one curve of the at least one function; and calculating, by the processor, an area under the at least one curve.

12. The method of claim 11, wherein the at least one machine learning network comprises a first machine learning network and a second machine learning network, the method further comprising:

comparing, by the processor, (iii) a first area under a first curve corresponding to the first machine learning network and (iv) a second area under a second curve corresponding to the second machine learning network; and selecting, by the processor, one of the first and the second machine learning networks based on the comparison for deployment in one or more vehicles.

13. A vehicle, comprising:

a plurality of sensors;

a memory storing computer-executable instructions; and at least one processor communicatively coupled to the plurality of sensors and the memory, wherein the at least one processor is configured to control at least one machine learning network, and wherein the at least one processor is configured to execute the computer-executable instructions to perform operations comprising:

obtaining ground truth data representing images of an environment of a vehicle;

mapping the first plurality of subsets to the plurality of sensors by:

determining, from the ground truth data, a plurality of perception regions of the environment, wherein each of the plurality of perception regions is associated with one of a plurality of sensors; and associating the first plurality of subsets with the plurality of perception regions;

determining a second plurality of subsets of the ground truth data by removing at least one subset from the first plurality of subsets, wherein removing at least one subset comprises:

obtaining, from a memory, data of a sensor drop rate; and randomly selecting, by the processor, a number of sensors from the plurality of sensors according to the data of the sensor drop rate;

inputting the second plurality of subsets to at least one machine learning network; and predicting, from the at least one machine learning network, a surrounding view of the environment.

14. The vehicle of claim 13, wherein the plurality of sensors comprise at least one of: cameras, or Light Detection and Ranging (LiDAR) sensors.

15. The vehicle of claim 13, the operations further comprising:

determining, by the processor, a plurality of positions on the vehicle corresponding to the plurality of sensors, wherein associating the first plurality of subsets with the plurality of perception regions comprises:

associating the plurality of perception regions with the plurality of positions.

16. The vehicle of claim 13, the operations further comprising: evaluating, by the processor, the at least one machine learning network based on the prediction.

17. The vehicle of claim 16, wherein evaluating the at least one machine learning network comprises:

determining, by the processor, at least one function of (i) a mean average precision of the prediction with respect to (ii) a mean value of a sensor drop rate; and evaluating the at least one machine learning network based on an integration of the at least one function.

18. A non-transitory computer-readable storage medium comprising at least one program for execution by at least one processor of a device, the at least one program including instructions which, when executed by the at least one processor, cause the device to perform operations comprising:

obtaining, by a processor, ground truth data representing images of an environment of a vehicle;

determining, by the processor, a first plurality of subsets of the ground truth data;

mapping the first plurality of subsets to a plurality of sensors by:

determining, by the processor, a plurality of perception regions of the environment from the ground truth data, wherein each of the plurality of perception regions is associated with one of the plurality of sensors; and associating, by the processor, the first plurality of subsets with the plurality of perception regions;

determining, by the processor, a second plurality of subsets of the ground truth data by removing at least one subset from the first plurality of subsets, wherein removing at least one subset comprises:

obtaining, from a memory, data of a sensor drop rate; and randomly selecting, by the processor, a number of sensors from the plurality of sensors according to the data of the sensor drop rate;

inputting, by the processor, the second plurality of subsets to at least one machine learning network; and predicting, by the processor, a surrounding view of the environment using an output of the at least one machine learning network.

19. The non-transitory computer-readable storage medium of claim 18, wherein:

the first plurality of subsets have a plurality of annotations corresponding to a plurality of objects in the environment, and removing the at least one subset comprises removing at least one annotation from the at least one subset.

20. The non-transitory computer-readable storage medium of claim 18, wherein determining the second plurality of subsets of the ground truth data by removing at least one subset from the first plurality of subsets comprises:

selecting at least one sensor of the plurality of sensors as being nonfunctional;

identifying a subset of the ground truth data associated with the at least one sensor that is selected as being nonfunctional; and determining the second plurality of subsets by removing the identified subset of ground truth data.

* * * * *